(12) United States Patent
Fukami (10) Patent No.: US 8,801,387 B2
(45) Date of Patent: Aug. 12, 2014

(54) WIND TURBINE BLADE AND WIND TURBINE GENERATOR INCLUDING THE SAME

(75) Inventor: Koji Fukami, Tokyo (JP)

(73) Assignee: Mitsubishi Heavy Industries, Ltd., Tokyo (JP)

(\*) Notice: Subject to any disclaimer, the term of this patent is extended or adjusted under 35 U.S.C. 154(b) by 0 days.

(21) Appl. No.: 13/468,205

(22) Filed: May 10, 2012

(65) Prior Publication Data

US 2012/0280509 A1 Nov. 8, 2012

Related U.S. Application Data

(63) Continuation of application No. PCT/JP2012/054664, filed on Feb. 24, 2012.

(30) Foreign Application Priority Data

Feb. 28, 2011 (JP) .................................. 2011-043189

(51) Int. Cl.
- *F01D 5/14* (2006.01)
- *F03D 1/06* (2006.01)

(52) U.S. Cl.
CPC ............. *F03D 1/0633* (2013.01); *Y02E 10/721* (2013.01); *F05B 2260/96* (2013.01); *F03D 1/0641* (2013.01); *Y02E 10/722* (2013.01); *Y10S 416/02* (2013.01)
USPC .................. 416/223 R; 416/DIG. 2

(58) Field of Classification Search
USPC ......................................... 416/DIG. 2, DIG. 5
See application file for complete search history.

(56) References Cited

U.S. PATENT DOCUMENTS

| 2,709,052 A | * | 5/1955 | Berg ............................ 244/35 R |
| 4,976,587 A | * | 12/1990 | Johnston et al. .............. 416/230 |
| 5,474,425 A | | 12/1995 | Lawlor | |

(Continued)

FOREIGN PATENT DOCUMENTS

| DE | 102008052858 A1 | 4/2010 |
| EP | 1152148 A1 | 11/2001 |
| JP | 2005533210 A | 11/2005 |
| JP | 3935804q B2 | 6/2007 |

OTHER PUBLICATIONS

International Search Report dated May 22, 2012 (Japanese Language and English Language).

(Continued)

*Primary Examiner* — Ned Landrum
*Assistant Examiner* — Ryan Ellis
(74) *Attorney, Agent, or Firm* — Manabu Kanesaka; Benjamin J. Hauptman (57) ABSTRACT

Provided is a wind turbine blade that can improve aerodynamic performance in a blade-tip region and reduce aerodynamic noise. A wind turbine blade includes a blade body having a chord length that decreases from a blade root side to a blade tip side, wherein the blade body includes a blade-tip region in which a dimensionless radial position is within the range of 0.6 to 1.0, inclusive, the dimension less radial position being the ratio of radial position to blade radius (½ of a blade diameter), and a blade-body region in which the dimensionless radial position is smaller than 0.6, and wherein a maximum-blade-thickness position of a blade cross-section in the blade-tip region is closer to a leading edge than a maximum-blade-thickness position of a blade cross-section in the blade-body region.

6 Claims, 12 Drawing Sheets

(56) References Cited

U.S. PATENT DOCUMENTS

| | | | | |
|---|---|---|---|---|
| 6,974,309 | B2* | 12/2005 | Seki | 416/227 R |
| 7,946,803 | B2* | 5/2011 | Wobben | 415/4.3 |
| 2008/0138206 | A1* | 6/2008 | Corren | 416/223 R |
| 2009/0202354 | A1 | 8/2009 | Godsk et al. | |
| 2010/0007148 | A1* | 1/2010 | Davis et al. | 290/54 |

OTHER PUBLICATIONS

Decision to Grant a Patent issued Jan. 14, 2014, corresponds Japanese patent application No. 2011-043189.

Extended European Search Report issued Mar. 5, 2014, corresponds to European patent application No. 12752158.1.

* cited by examiner

WIND TURBINE BLADE AND WIND TURBINE GENERATOR INCLUDING THE SAME

CROSS REFERENCE TO RELATED APPLICATIONS

This is a continuation of International Application PCT/JP2012/054664, with an international filing date of Feb. 24, 2012, which is hereby incorporated by reference herein in its entirety. This application claims the benefit of Japanese Patent Application No. 2011-043189, the content of which is incorporated herein by reference.

TECHNICAL FIELD

The present invention relates to a wind turbine blade and a wind turbine generator including a wind turbine blade.

BACKGROUND ART

Recently, wind turbine generators have been drawing attention as a source of clean energy that does not discharge greenhouse gases during generation. A wind turbine generator has wind turbine blades rotating around an axis by the force of wind and generates power by converting the rotational force to electric power.

The power generated by the wind turbine generator is a product of the shaft-end output (power generated by the blades) multiplied by the conversion efficiency (efficiency of the bearings and generator). The shaft-end output is given by the expression below. Power generation is increased by using blades with high blade efficiency and a large blade diameter.

$$\text{shaft-end output} = \tfrac{1}{2} \times \text{air density} \times \text{wind speed}^3 \times \text{blade efficiency} \times \pi \times \text{blade diameter}^2 / 2^2$$

The blade efficiency has a theoretical upper limit (Betz limit=0.593). The actual upper limit is approximately 0.5 due to the influence of the wind turbine wake and air resistance of the blades. Thus, it is difficult to significantly improve the blade efficiency further.

Since power output increases as the square of the blade diameter, it is effective to increase the blade diameter in order to increase power generation. However, an increase in the blade diameter may cause an increase in aerodynamic load (the thrust acting in the inflow direction and the moment transmitted to the blade root). Such an increase may cause equipment such as the rotor head, the nacelle, and the tower to increase in size and weight, causing an increase in costs. Furthermore, an increase in the blade diameter may cause an increase in aerodynamic noise due to an increase in the tip speed at the blade tip. Hence, there is a need for an aerodynamics technology that achieves performance improvement and noise reduction without increasing the blade diameter.

Typically, a wind turbine blade has a predetermined optimal chord length corresponding to a certain tip speed ratio and satisfies the relationship represented by the following expression (Wind Energy Handbook, John Wiley & Sons, p. 378):

$$C_{opt}/R \times \lambda^2 \times CL_{design} \times r/R \approx 16/9 \times \pi/n \tag{1}$$

where Copt is the optimal chord length, R (blade radius) is ½ of the blade diameter, $\lambda$ is the design tip-speed ratio, CLdesign is the design lift coefficient, r is the radial position of a blade cross-section, and n is the number of blades.

The design tip-speed ratio is the ratio of blade-tip speed to infinite upstream wind speed. The design lift coefficient is a lift coefficient for the angle-of-attack corresponding to a maximum lift-to-drag ratio (lift/drag) of an airfoil (blade cross-section) and is determined in accordance with the (aerodynamic) shape of the airfoil (blade cross-section) and the inflow condition (Reynolds number).

Figure 13:
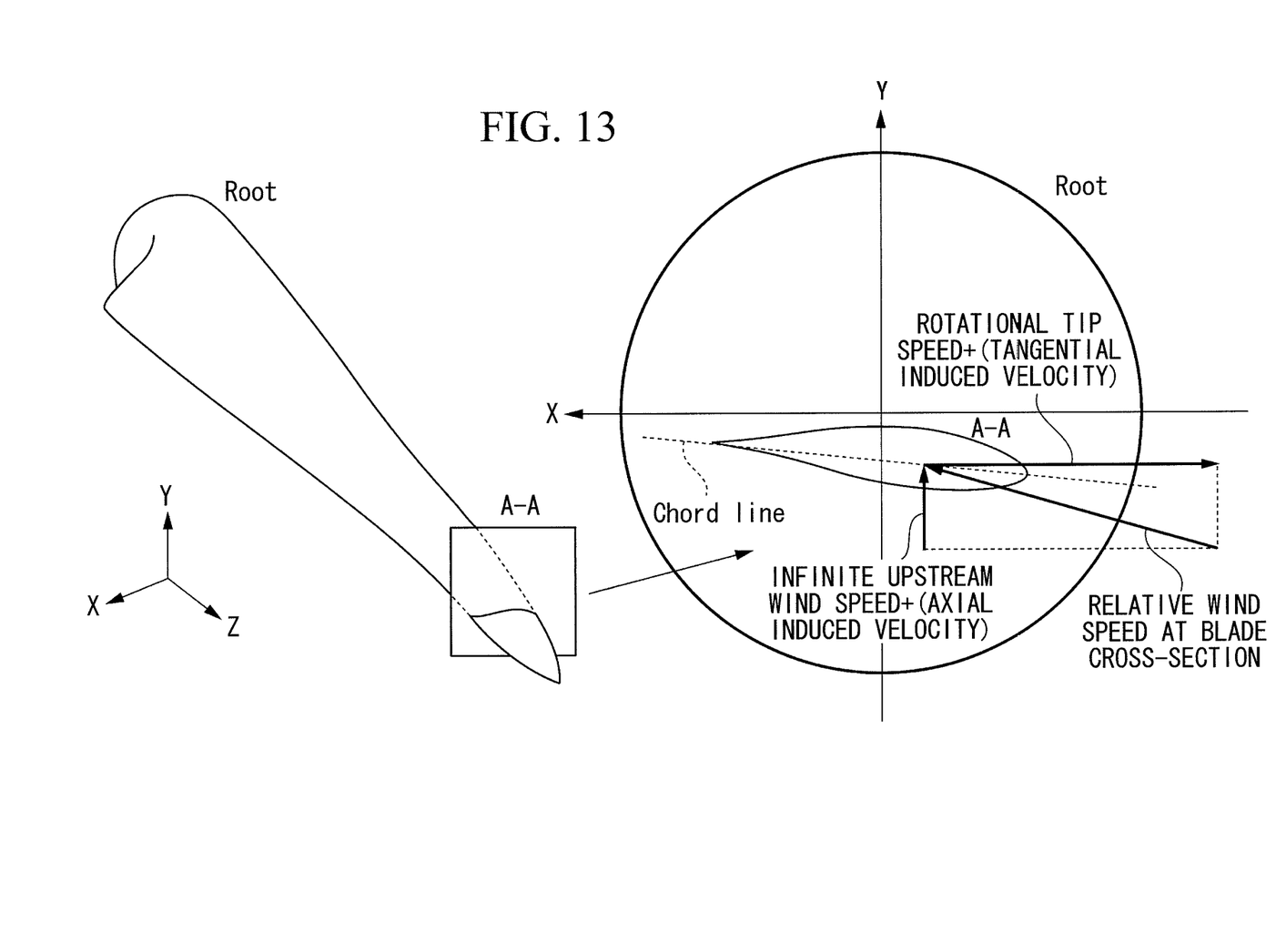
FIG. 13 illustrates the relative wind speed at blade cross-section.

FIG. 13 illustrates the relative wind speed at blade cross-section. As illustrated in FIG. 13, the Reynolds number of a wind turbine is determined in consideration of the relative wind speed at a cross-section A-A of a blade rotating at a predetermined rotating speed and is represented by the following equation:

Reynolds number=air density×relative wind speed at blade cross-section×chord length of blade cross-section/viscosity coefficient of air PTL 1 discloses an airfoil for increasing the wind-turbine power output. Specifically, it discloses an airfoil having a blade thickness ratio in the range of 14% to 45% and a design lift coefficient in the range of 1.10 to 1.25 (refer to Claim 1).

CITATION LIST

Patent Literature

{PTL 1}
European Patent Application Publication No. 1152148

SUMMARY OF INVENTION

Technical Problem

Figure 14:
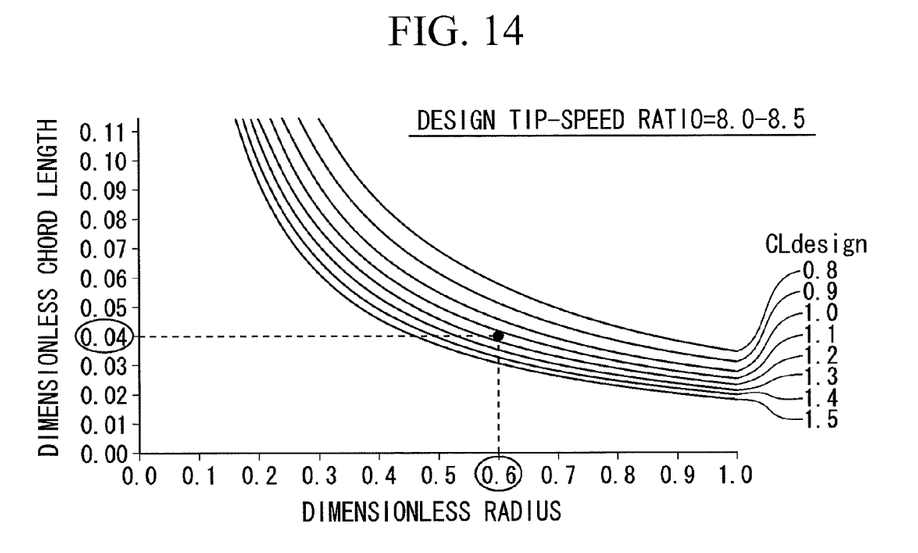
FIG. 14 illustrates the distribution of design lift coefficient against the dimensionless radius.

FIG. 14 illustrates the relationship represented by Expression (1). In FIG. 14, the horizontal axis represents the dimensionless radius, and the vertical axis represents the dimensionless chord length. The dimensionless radius (r/R) is the ratio of radial position r of a blade cross-section measured from the rotation center to blade radius R. The dimensionless chord length (c/R) is the ratio of chord length c of a blade cross-section to blade radius R.

FIG. 14 illustrates multiple curves representing Expression (1) with a constant design lift coefficient CLdesign. Since the curves with a constant design lift coefficient CLdesign satisfy Expression (1), an optimal chord length (vertical axis) at a specific design tip-speed ratio can be determined in consideration of the aerodynamic characteristics. In FIG. 14, the design tip-speed ratio is within the range of 8.0 to 8.5, inclusive, and the Reynolds number is within the range of 3,000,000 to 10,000,000, inclusive.

In this way, an optimal chord length (dimensionless) that achieves optimal performance is determined by Expression (1) once the radial position and the design tip-speed ratio are determined; or the design lift coefficient that achieves optimal performance of an airfoil (blade cross-section) is determined by Expression (1) once the radial position and the design chord length are determined. For example, at a position where the dimensionless radius r/R=0.6, the design lift coefficient at which the dimensionless chord length c/R=0.04 gives optimal performance is 1.15.

Figure 15:
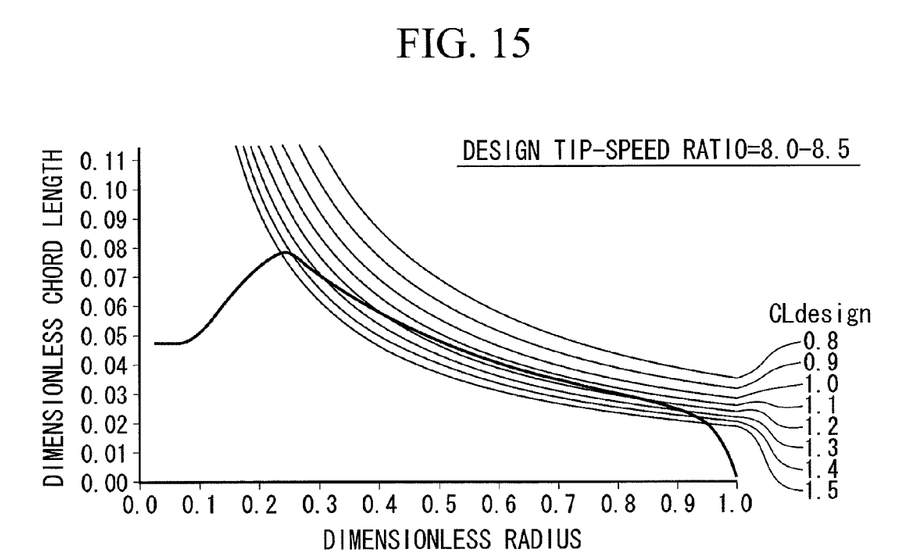
FIG. 15 illustrates the distribution of the actual chord length on the graph of FIG. 14.

FIG. 15 illustrates the optimal chord-length distribution determined by Expression (1) and the actual chord-length distribution (thick line). In the blade-tip region, the difference between the optimal chord length and the actual chord length inevitably becomes large because the actual chord length goes asymptotically to zero, causing a loss of efficiency.

Thus, there is a need for an aerodynamic design technology that improves the aerodynamic performance in the blade-tip region and reduces aerodynamic noise.

The present invention has been conceived in light of such circumstances and provides a wind turbine blade and a wind turbine generator including a wind turbine blade that can improve aerodynamic performance in the blade-tip region and reduce aerodynamic noise.

Solution to Problem

To solve the problems described above, the wind turbine blade and the wind turbine generator including a wind turbine blade according to the present invention provide the following solutions.

The wind turbine blade according to a first aspect of the present invention includes a blade body having a chord length that decreases from a blade root side to a blade tip side, wherein the blade body includes a blade-tip region in which a dimensionless radial position is within the range of 0.6 to 1.0, inclusive, the dimensionless radial position being the ratio of radial position to blade radius (½ of a blade diameter), and a blade-body region in which the dimensionless radial position is smaller than 0.6, and wherein a maximum-blade-thickness position of a blade cross-section in the blade-tip region is closer to a leading edge than a maximum-blade-thickness position of a blade cross-section in the blade-body region.

The inventors studied the performance by conducting a numerical simulation in which the maximum-blade-thickness position of a blade cross-section was varied. As a result, it was discovered that, if the maximum-blade-thickness position is closer to the leading edge, the aerodynamic performance improves as a result of an increase in the design lift coefficient and maximum lift-to-drag ratio, and noise is reduced as a result of a reduction in the boundary layer thickness (displacement thickness).

On the other hand, if maximum-blade-thickness positions are set near the leading edge, the thickness of the trailing edge becomes relatively small. As a result, the strength of the trailing edge decreases against the edge moment generated by a load exerted on the wind turbine blade.

The present invention takes into account the fact that, for a wind turbine blade whose rotation center is at the blade root, the edge moment is small at the blade tip compared with the edge moment at the blade root, and thus, even when the maximum-blade-thickness position is close to the leading edge, the strength near the trailing edge will not be a significant problem.

Accordingly, the maximum-blade-thickness position in the blade-tip region in which the dimensionless radial is set within the range of 0.6 to 1.0, inclusive, is closer to the leading edge than the maximum-blade-thickness position in the blade-body region in which the dimensionless radial position is smaller than 0.6. In this way, the aerodynamic performance of the blade-tip region is improved, and aerodynamic noise at the blade-tip region where the tip speed is the greatest, which is the main cause of noise, can be effectively reduced.

In the wind turbine blade according to the first aspect of the present invention, in the blade-tip region, the maximum-blade-thickness position is shifted in the direction of the leading edge toward the blade tip.

With this configuration, even at the blade tip, where the design lift coefficient is decreased because blade cross-sections that are the same as those in the blade-body region cannot be maintained due to a small chord length, the aerodynamic performance can be improved by increasing the design lift coefficient and maximum lift-to-drag ratio as a result of shifting the maximum-blade-thickness positions in the direction of the leading edge as one goes toward the blade tip. At the same time, aerodynamic noise can be effectively reduced in the blade tip area, where the tip speed and noise are great.

It is preferable that, in the wind turbine blade according to the first aspect of the present invention described above, when the chord length at the leading edge is defined as 0%, and the chord length of a trailing edge is defined as 100%, the dimensionless radial position be set within a range of 0.6 to 0.9, inclusive, and the maximum-blade-thickness position be set within a range of 25% to 40% chord length, inclusive, and the dimensionless radial position be set within the range of 10% to 30% chord length, inclusive, when the dimensionless radial position is 1.0.

It is preferable that, in the wind turbine blade according to the first aspect of the present invention described above, the dimensionless radial position be set within a range of 0.7 to 0.85, inclusive, and the maximum-blade-thickness position be set within a range of 26% to 36% chord length, inclusive, and the dimensionless radial position be set within the range of 20% to 30% chord length, inclusive, where the dimensionless radial position is 1.0.

In any of the above-described wind turbine blades according to the first aspect of the present invention, the leading edge in the blade-tip region may be shifted in the direction of the trailing edge such that a maximum-blade-thickness line connecting the maximum-blade-thickness positions of the blade cross-sections at radial positions form a substantially straight line.

A beam, which provides most of the strength of the wind turbine blade, connects the maximum-blade-thickness positions and extends in the radial direction. Thus, it is preferable that the maximum-blade-thickness line, which is formed by connecting, in the radial direction, the maximum-blade-thickness positions of the blade cross-sections at corresponding radial positions, be a substantially straight line in the radial direction.

According to the present invention, even when the maximum-blade-thickness positions in the blade-tip region are closer to the leading edge than those in the blade-body region, by shifting the leading edge in the direction of the trailing edge, the maximum-blade-thickness line can be maintained as a substantially straight line in the radial direction.

For example, in a plan view of the back or front of the wind turbine blade, the leading edge of the wind turbine blade according to the present invention is shaped like a letter S such that it is largely shifted in the direction of the trailing edge in a transitional region from the blade-body region to the blade-tip region, is gradually shifted in the direction of the trailing edge toward the blade tip, and finally, is shifted in the direction of the trailing edge to connect to the blade tip.

In the present invention, by shifting the leading edge in the direction of the trailing edge as described (in particular, in an S-shape), the trailing edge can be rounded with a greater curvature. In this way, the angular position at which aerodynamic noise generated at the trailing edge in the blade-tip region can be shifted in the blade radius direction, and noise can be reduced even more.

In any of the above-described wind turbine blades according to the first aspect of the present invention, the cross-sectional shape of the blade tip may be a symmetrical airfoil.

The cross-section at the blade tip is a symmetrical airfoil, i.e., an airfoil having zero camber. In this way, the blade tip area, having a thin and complicated shape that is normally difficult to manufacture, can be manufactured easily.

Preferably, the cambers of airfoils close to the blade tip in the blade-tip region gradually approach zero in the direction of the blade tip and reach zero at the blade tip.

A wind turbine generator according to a second aspect of the present invention includes one of the wind turbine blades described above; a rotor connected to a blade root of the wind turbine blade and rotated by the wind turbine blade; and a generator configured to convert a rotational force received by the rotor to electric power.

Since the above-described wind turbine blade is included, a wind turbine generator that increases power output through improved aerodynamic performance and reduces aerodynamic noise can be provided.

Advantageous Effects of Invention

According to the present invention, maximum-blade-thickness positions in the blade-tip region are closer to the leading edge than maximum-blade-thickness positions in the blade-body region. Accordingly, the aerodynamic performance of the blade-tip region can be improved, and the aerodynamic noise at the blade-tip region can be effectively reduced.

DESCRIPTION OF EMBODIMENTS

A wind turbine blade and a wind turbine generator including a wind turbine blade according to embodiments of the present invention will be described below with reference to the drawings.

First Embodiment

A wind turbine blade according to the first embodiment is suitable for use as a blade of a wind turbine generator. For example, three wind turbine blades are radially connected to a rotor and are disposed approximately 120 degrees apart. Preferably, the wind turbine blade is a thin blade having a rotating diameter (blade diameter) of 60 m or more and solidity (projected area of entire blade divided by area swept by blade) within the range of 0.2 to 0.6, inclusive. The pitch of the wind turbine blade may be variable or fixed.

Figure 1:
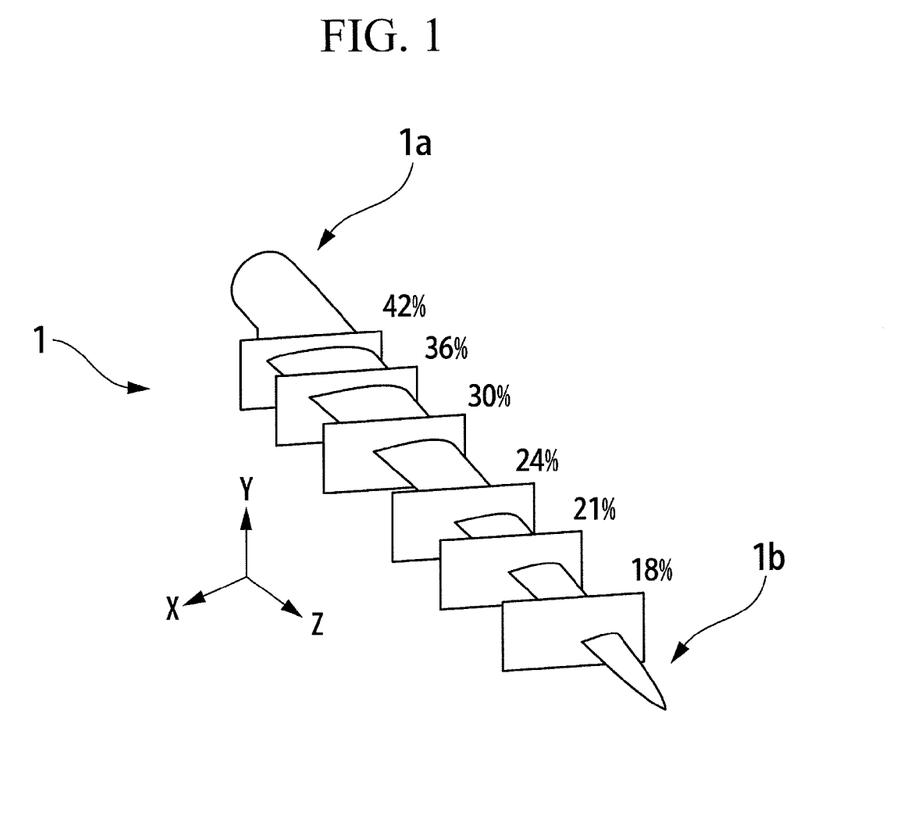
FIG. 1 is a perspective view of a wind turbine blade having a typical shape.

As illustrated in FIG. 1, a wind turbine blade 1 is a three-dimensional blade extending from a blade root 1a, which is the end closer to the rotation center, to a blade tip 1b.

As illustrated in FIG. 1, the shape of a blade is defined by blade element cross-sections taken through planes Z=constant (where Z is the longitudinal direction of the blade) at radial positions (positions that are certain distances away from the rotation center of the blade) corresponding to certain blade thickness ratios (values, expressed as a percentage, obtained by dividing maximum blade thickness by chord length). FIG. 1 illustrates that the shape of the wind turbine blade is defined by blade element cross-sections taken at radial positions corresponding to blade thickness ratios of 18%, 21%, 24%, 30%, 36%, and 42%. Instead of using blade thickness ratios, the radial positions of the wind turbine blade 1 may be the radial positions r corresponding to the distances from the rotation center of the blade (or a dimensionless radial position r/R, which is the ratio of radial position to blade radius).

Figure 2:
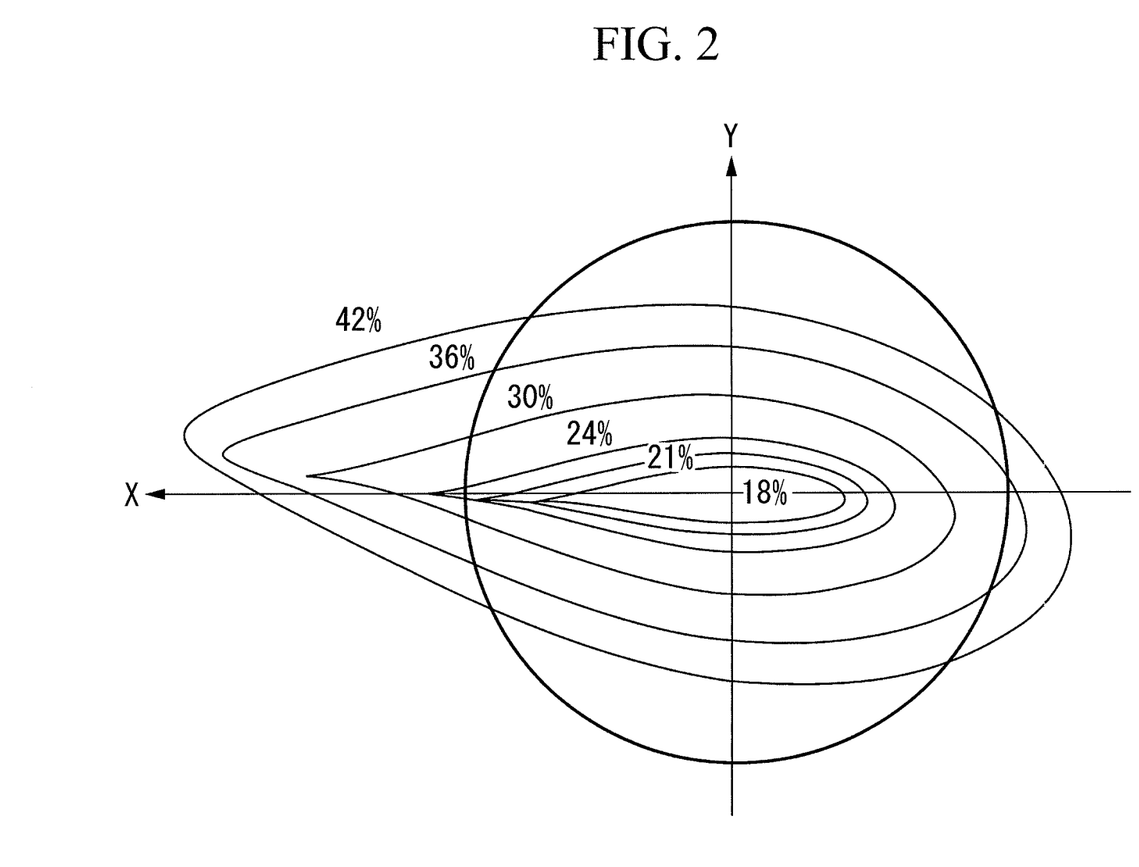
FIG. 2 illustrates cross-sections corresponding to the blade thickness ratios illustrated in FIG. 1.

FIG. 2 illustrates a projection of the blade element cross-sections in FIG. 1 onto the XY plane (the plane orthogonal to the Z axis). When viewed from the tip of the wind turbine blade 1 along the longitudinal direction, the leading edge of the blade is on the right side, and the trailing edge of the blade is on the left side in FIG. 2. As illustrated in FIG. 2, the wind turbine blade is shaped such that the chord length decreases from the blade root to the blade tip.

Figure 16:
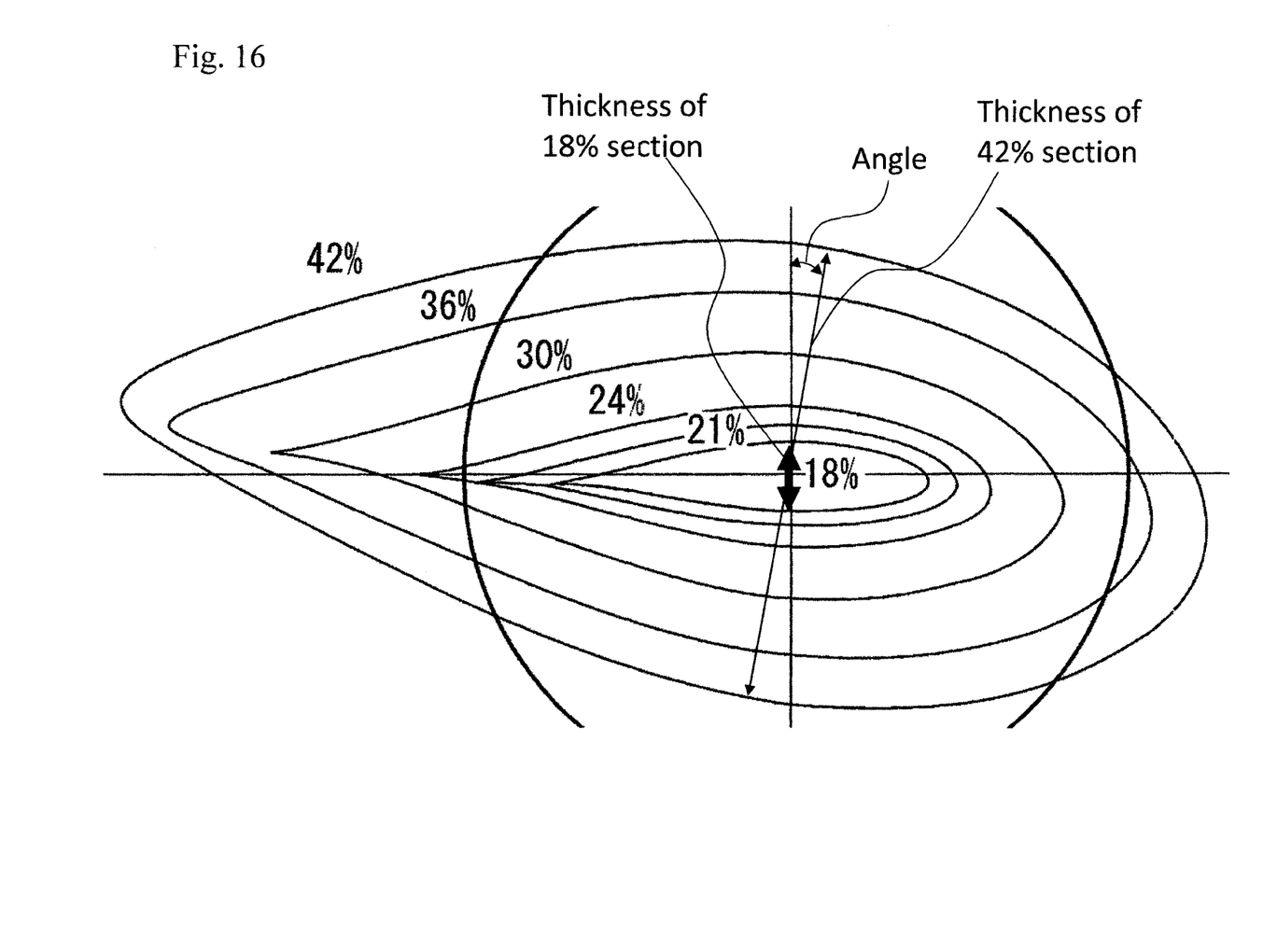
FIG. 16 illustrates cross-sections corresponding to the blade thickness ratios illustrated in FIG. 1, and is substantively identical to FIG. 2, but includes the addition of the annotation in FIG. 16 not present in FIG. 2.

FIG. 16 illustrates cross-sections corresponding to the blade thickness ratios illustrated in FIG. 1, and is substantively identical to FIG. 2, but includes the addition of the annotation in FIG. 16 not present in FIG. 2. From FIG. 16, it can be seen that the maximum-blade-thickness position of the blade cross-section in the blade-tip region (the vertical arrow/ the shorter arrow) is angularly different from the maximum-blade-thickness position of the blade-cross-section in the blade-body (arrow angled with respect to the vertical arrow/ the longer arrow).

Figure 3:
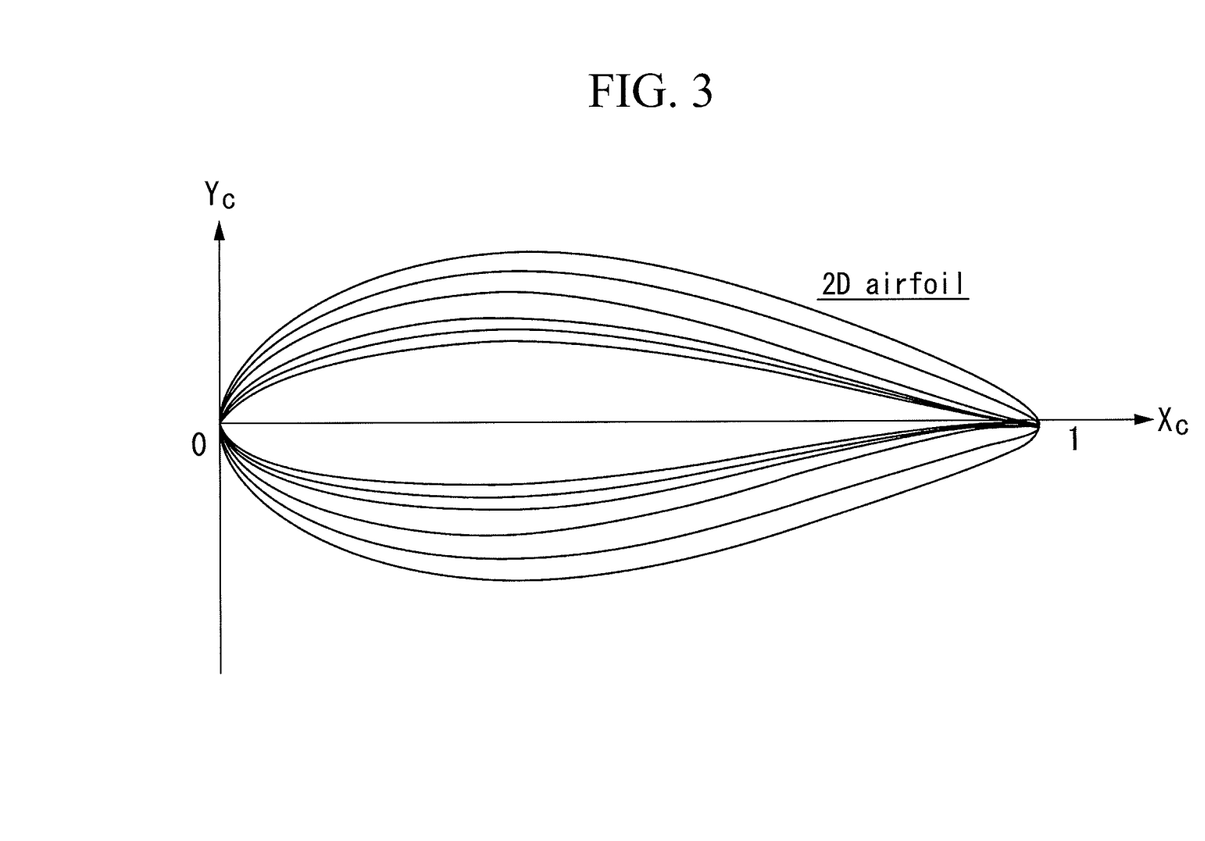
FIG. 3 illustrates airfoils corresponding to the blade thickness ratios illustrated in FIG. 1.

FIG. 3 illustrates the blade element cross-sections corresponding to the blade thickness ratios of the wind turbine blade 1 normalized by setting the leading edge at X=0 and Y=0 and the trailing edges at X=1 and Y=0. These shapes illustrated in FIG. 3 are known as airfoils.

Figure 4:
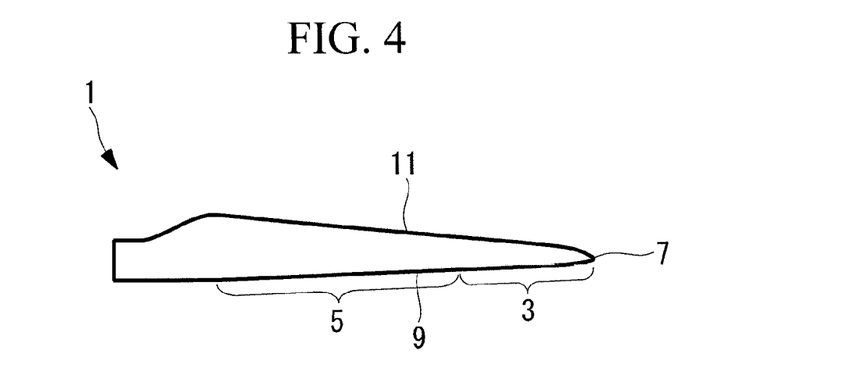
FIG. 4 is a plan view of the shape of a blade according to an embodiment of the present invention.

As illustrated in FIG. 4, the wind turbine blade 1 according to this embodiment has a blade-tip region 3 in which dimensionless radial positions r/R, which is the ratio of radial position r to blade radius R (½ of the blade diameter), is within the range of 0.6 to 1.0, inclusive, and a blade-body region 5 in which dimensionless radial positions are less than 0.6. The maximum-blade-thickness positions of the blade cross-sections in the blade-tip region 3 is closer to the leading edge 9 than the maximum-blade-thickness positions of the blade cross-sections in the blade-body region 5.

Figure 5:
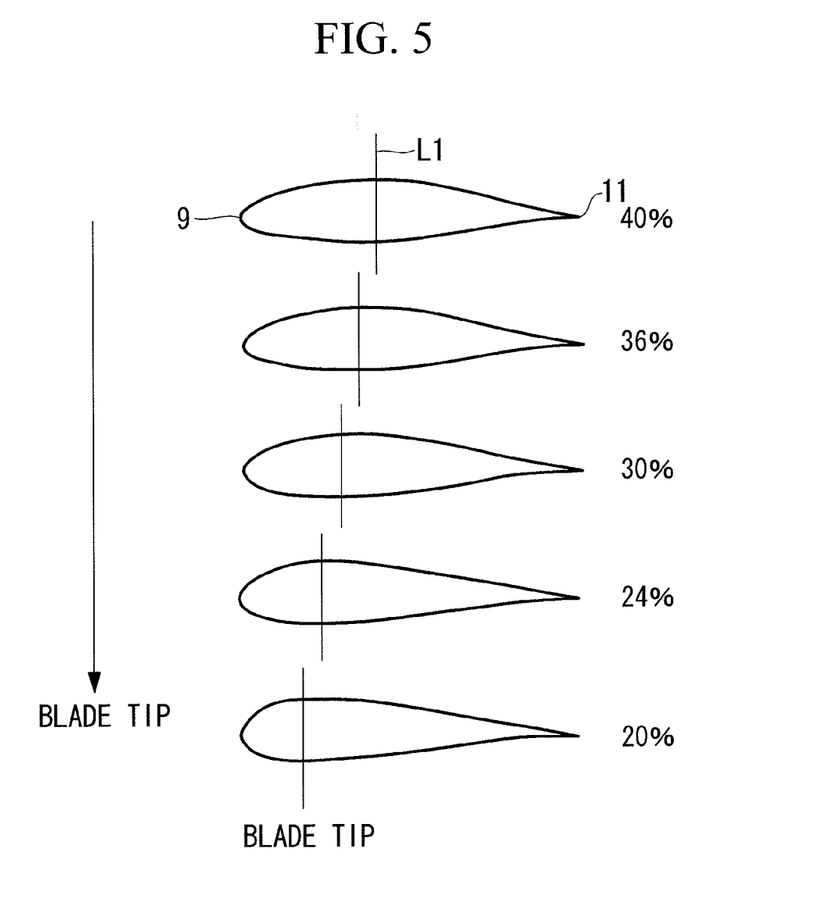
FIG. 5 illustrates blade cross-sections including maximum-blade-thickness positions at certain radial positions.

Specifically, as indicated by the blade cross-sections in FIG. 5, the maximum-blade-thickness positions shift from the blade root side to the blade tip side, e.g., the chord length varies, starting from 40% and decreasing to 36%, 30%, 24%, and 20%, where the chord length at the leading edge is defined as 0%, and the chord length of the trailing edge is defined as 100%. Line segments L1 in FIG. 5 represent the maximum-blade-thickness positions. In the case of the wind turbine blade illustrated in FIG. 5, a maximum-blade-thickness position in the blade-body region 5 corresponds to a chord length of 40% or more.

As illustrated in FIG. 5, it is preferable that the maximum-blade-thickness position be gradually shifted in the direction of the leading edge 9 as one goes toward the blade tip 7 (see FIG. 4).

Preferably, the maximum-blade-thickness positions in the blade-tip region 3 are set within the range of 25% to 40% chord length, inclusive, in a region in which the dimensionless radial positions are within the range of 0.6 to 0.9, inclusive, and are set within the range of 10% to 30% chord length, inclusive, where the dimensionless radial position is 1.0 (i.e., at the blade tip 7).

More preferably, the maximum-blade-thickness positions in the blade-tip region 3 are set within the range of 26% to 36% chord length, inclusive, in a region in which the dimensionless radial positions are within the range of 0.7 to 0.85, inclusive, and are set within the range of 20% to 30% chord length, inclusive, where the dimensionless radial position is 1.0.

The blade tip 7 has a symmetric airfoil. That is, the airfoil has zero camber. In this way, the blade tip area, having a thin and complicated shape that is normally difficult to manufacture, can be manufactured easily.

Preferably, the cambers of airfoils close to the blade tip 7 in the blade-tip region 3 gradually approach zero toward the blade tip 7 and reach zero at the blade tip 7.

Next, the reason for setting the maximum-blade-thickness positions in the blade-tip region 3 closer to the leading edge 9 than the maximum-blade-thickness positions in the blade-body region 5, as in this embodiment, will be described below.

Figure 6:
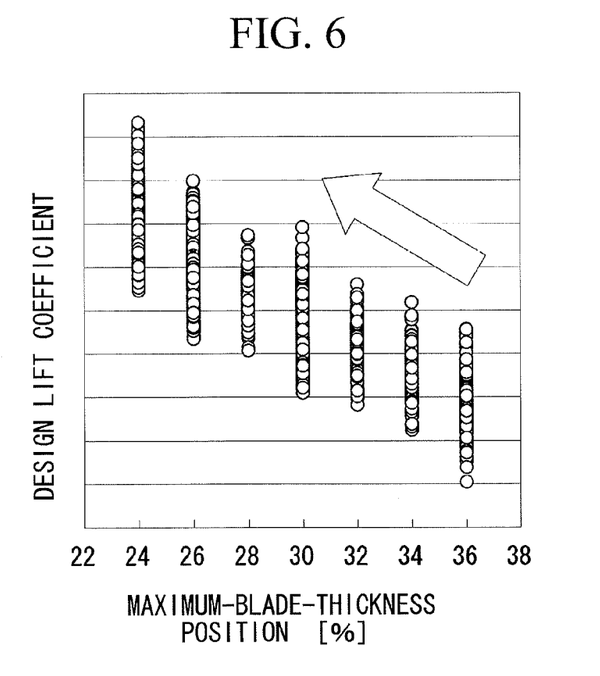
FIG. 6 is a graph showing the maximum-blade-thickness position versus the design lift coefficient.
Figure 7:
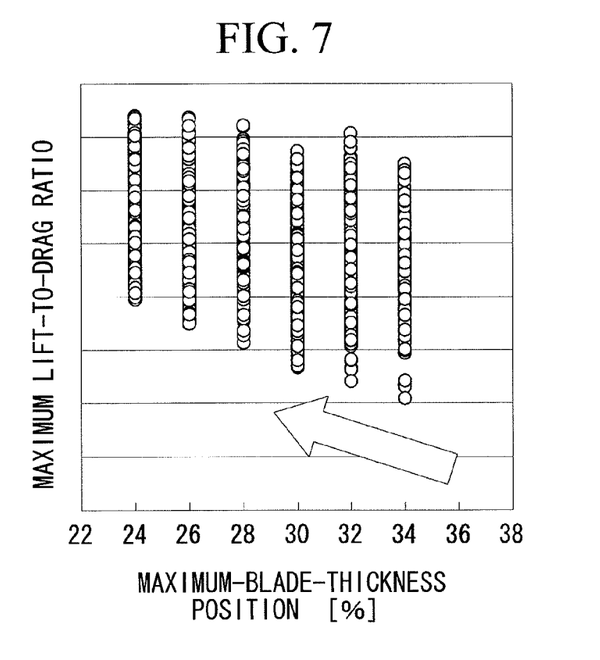
FIG. 7 is a graph showing the maximum-blade-thickness position versus maximum lift-to-drag ratio.
Figure 8:
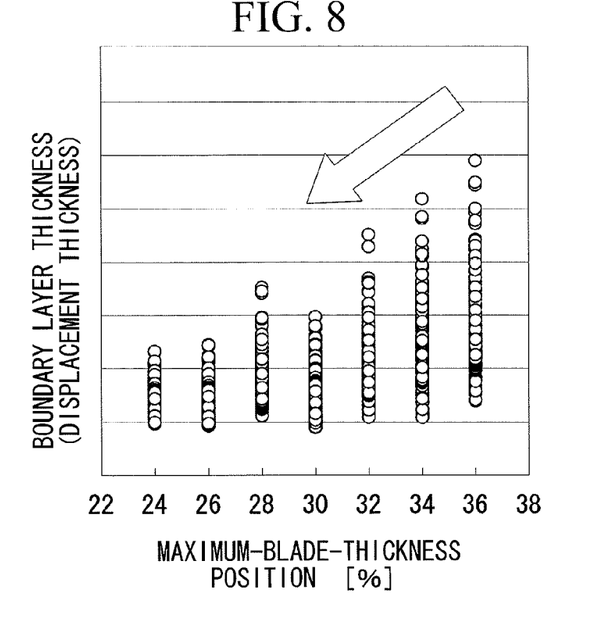
FIG. 8 is a graph showing the maximum-blade-thickness position versus boundary layer thickness (displacement thickness).

FIGS. 6 to 8 illustrate results of a numerical simulation conducted on airfoils with varying maximum-blade-thickness positions in the range of 24% to 36% chord length. The conditions for the numerical simulation included a design tip-speed ratio within the range of 8.0 to 8.5, inclusive, and a Reynolds number within the range of 3,000,000 to 10,000,000, inclusive.

As illustrated in FIGS. 6 to 8, by setting the maximum-blade-thickness positions in the blade-tip region 3 closer to the leading edge 9 than the maximum-blade-thickness positions in the blade-body region 5, the aerodynamic performance improves as a result of an increase in the design lift coefficient and maximum lift-to-drag ratio, and noise is reduced as a result of a reduction in the boundary layer thickness (displacement thickness).

As described above, the following advantages are achieved through this embodiment.

As a result of the numerical simulation conducted to study the performance while the maximum-blade-thickness position of a blade cross-section is varied, it was discovered that if the maximum-blade-thickness position is close to the leading edge 9, the aerodynamic performance improves as a result of an increase in the design lift coefficient and the maximum lift-to-drag ratio, and noise is reduced as a result of a reduction in the boundary layer thickness (displacement thickness).

However, if the maximum-blade-thickness position is close to the leading edge 9, the trailing edge 11 becomes relatively thin, and the strength of the trailing edge 11 against edge moment, which occurs due to the load exerted on the wind turbine blade 1, may decrease.

This embodiment takes into account the fact that strength near the trailing edge 11 is not a significant problem on the blade tip 7 side even when the maximum-blade-thickness position is close to the leading edge 9 because the edge moment is smaller than the edge moment on the blade root side.

Accordingly, in this embodiment, the maximum-blade-thickness positions in the blade-tip region 3 is closer to the leading edge 9 than the maximum-blade-thickness positions in the blade-body region 5. In this way, the aerodynamic performance of the blade-tip region 3 is improved, and aerodynamic noise in the blade-tip region where the tip speed is the greatest, which is the main cause of noise, can be effectively reduced.

Even at the blade tip 7, where the design lift coefficient is decreased because blade cross-sections that are the same as those in the blade-body region 5 cannot be maintained due to a small chord length, the aerodynamic performance can be improved by increasing the design lift coefficient and maximum lift-to-drag ratio as a result of shifting the maximum-blade-thickness positions in the direction of the leading edge 9 as one goes toward the blade tip 7. At the same time, aerodynamic noise can be effectively reduced near the blade tip 7, where the tip speed is great, causing an increase in noise.

By applying the wind turbine blade 1 according to this embodiment to a wind turbine generator including a rotor connected to the blade root of the wind turbine blade and rotated by the wind turbine blade and a generator that converts the rotational force of the rotor to electric power, it is possible to provide a wind-power apparatus having an increased power output due to improved aerodynamic performance and generating less aerodynamic noise.

Second Embodiment

A second embodiment of the present invention will be described below. This embodiment differs from the first embodiment in that the maximum-blade-thickness line formed by connecting the maximum-blade-thickness positions of the blade cross-sections at the radial positions in the blade radius direction is optimized in accordance with the shape of the leading edge 9 in the blade-tip region 3. Other configurations, i.e., setting the maximum-blade-thickness positions in the blade-tip regions closer to the leading edge than the maximum-blade-thickness positions in the blade-body region, are the same. Hence, only the differences will be described below, and descriptions of similarities will be omitted.

Figure 9:
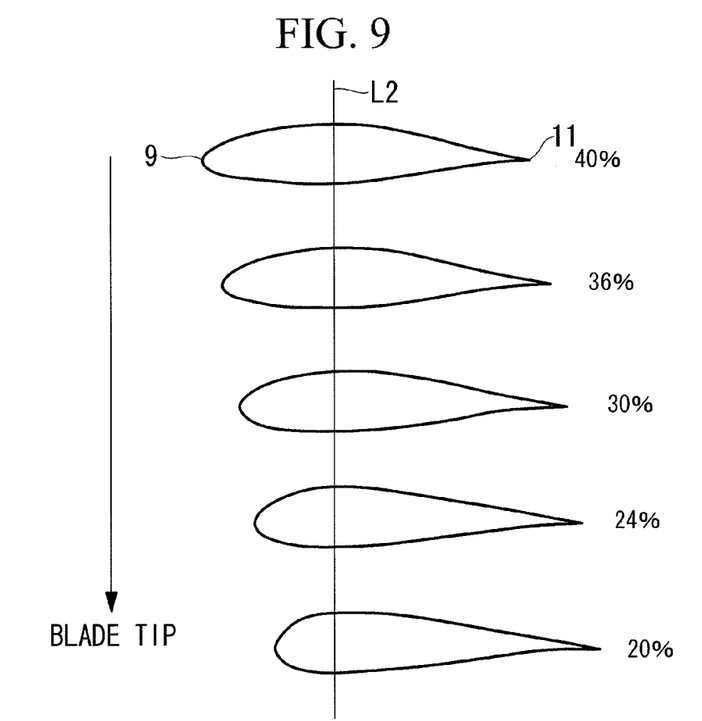
FIG. 9 illustrates blade cross-sections including maximum-blade-thickness positions at certain radial positions of a wind turbine blade according to a second embodiment of the present invention.

FIG. 9 illustrates the maximum-blade-thickness positions at certain radial positions of a wind turbine blade according to this embodiment. The line segment L2 in FIG. 9 represents the maximum-blade-thickness positions. The maximum-blade-thickness positions are set such that the angular positions at the radial positions are the same with respect to the blade rotation center. This is achieved by shifting the leading edge 9 further in the direction of the trailing edge 11 when going toward the blade tip, as illustrated in FIG. 9. In this way, the maximum-blade-thickness line, which is formed by connecting, in the radial direction, the maximum-blade-thickness positions of the blade cross-sections at the radial positions, is a substantially straight line along the radial direction of the wind turbine blade.

Figure 10:
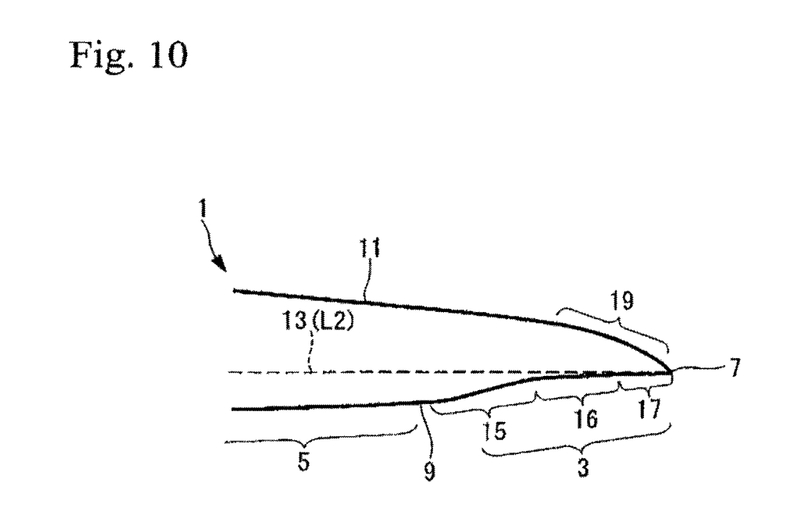
FIG. 10 is a plan view of a tip region of the wind turbine blade according to the second embodiment of the present invention.

FIG. 10 illustrates the substantially straight maximum-blade-thickness line 13 formed by shifting the leading edge 9 in the direction of the trailing edge 11, as illustrated in FIG. 9.

As illustrated in FIG. 10, the leading edge 9 in the blade-tip region 3 is S-shaped such that the leading edge 9 shifts greatly toward the trailing edge 11 in a transition region 15 from the blade-body region 5 to the blade-tip region 3, shifts gradually in the direction of the trailing edge toward the blade tip 7 in a connecting region 16, which is connected to the transition region 15, and shifts in the direction of the trailing edge 11 to finally connect with the blade tip 7 in an end region 17, which is connected to the connecting region 16.

In this way, by extending a substantially straight maximum-blade-thickness line 13 in the radial direction, the following advantages are achieved.

Figure 11:
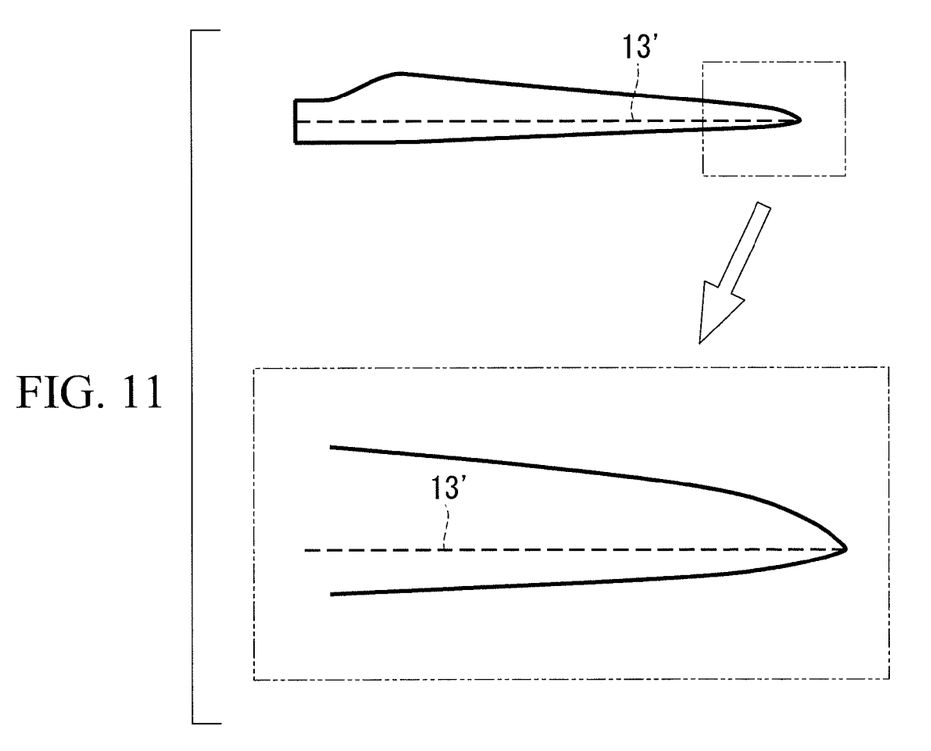
FIG. 11 is a plan view of a conventional wind turbine blade.

Typically, a beam, which provides most of the strength of the wind turbine blade, extends in the radial direction at the maximum-blade-thickness positions. For example, as illustrated in FIG. 11, in a conventional wind turbine blade, the maximum-blade-thickness line 13' extends straight along the radial direction. Providing a straight beam facilitates manufacturing. In FIG. 11, the maximum-blade-thickness positions in the blade-body region are the same as the maximum-blade-thickness positions in the blade-tip region.

Figure 12:
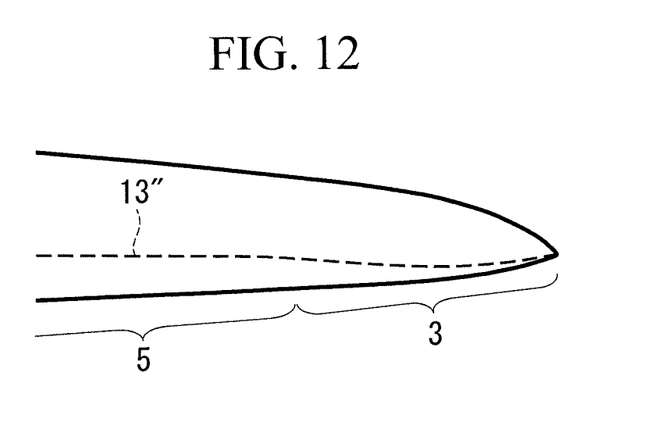
FIG. 12 is a plan view of a tip region of a wind turbine blade according to a comparative example.

If, however, the leading edge and the trailing edge are shaped the same as those illustrated in FIG. 11, with the maximum-blade-thickness positions in the blade-tip region 3 being closer to the leading edge 9 than the maximum-blade-thickness positions in the blade-body region 5, as described in the first embodiment, the maximum-blade-thickness line 13" is unable to maintain a straight line and curves in the blade-tip region 3, as illustrated in FIG. 12.

Hence, in this embodiment, the maximum-blade-thickness line 13 is a substantially straight line set by shifting the leading edge 9 in the direction of the trailing edge 11 (see FIG. 10). In this way, a substantially straight beam can be used, facilitating manufacturing. If a receptor, which is a lightning strike point, is disposed at a maximum-blade-thickness position, the receptor can be disposed in a substantially straight line, facilitating manufacturing.

As illustrated in FIG. 10, the trailing edge 11 can be rounded with a larger curvature by shifting the leading edge 9 in the direction of the trailing edge 11 (in particular, shaping the leading edge 9 like a letter S) in the blade-tip region 3, as described in this embodiment (region 19 in FIG. 10). In this way, the angular position at which aerodynamic noise generated at the trailing edge 11 in the blade-tip region 3 can be shifted in the blade radius direction, and noise can be reduced even more.

In this embodiment, the design tip-speed ratio is set within the range of 8.0 to 8.5, inclusive. However, the design tip-speed ratio in the present invention is not limited and may be set, for example, within the range of 6.0 to 9.0, inclusive.

REFERENCE SIGNS LIST 1 wind turbine blade
1a blade root
1b blade tip
3 blade-tip region
5 blade-body region
7 blade tip
9 leading edge
11 trailing edge
13 maximum-blade-thickness line

The invention claimed is:

1. A wind turbine blade comprising:
a blade body having a chord length that decreases from a blade root side to a blade tip side,
wherein
the blade body includes
a blade-tip region in which a dimensionless radial position is within the range of 0.6 to 1.0, inclusive, the dimensionless radial position being the ratio of radial position to blade radius (½ of a blade diameter), and
a blade-body region in which the dimensionless radial position is smaller than 0.6,
wherein a maximum-blade-thickness position of a blade cross-section in the blade-tip region is closer to a leading edge than a maximum-blade-thickness position of a blade cross-section in the blade-body region,
wherein the leading edge in the blade-tip region is shifted in the direction of the trailing edge such that a maximum-blade-thickness line formed by connecting, in the radial direction, the maximum-blade-thickness positions of the blade cross-sections at radial positions form a substantially straight line, and
wherein the leading edge in the blade-tip region is S-shaped such that the leading edge shifts greatly toward the trailing edge in a transition region from the blade-body region to the blade-tip region, shifts gradually in the direction of the trailing edge toward the blade tip in a connecting region, which is connected to the transition region, and shifts in the direction of the trailing edge to finally connect with the blade tip in an end region, which is connected to the connecting region.

2. The wind turbine blade according to claim 1, wherein, in the blade-tip region, the maximum-blade-thickness position is shifted in the direction of the leading edge toward the blade tip.

3. The wind turbine blade according to claim 2, wherein, when the chord length at the leading edge is defined as 0%, and the chord length of a trailing edge is defined as 100%,
the dimensionless radial position is set within a range of 0.6 to 0.9, inclusive, and the maximum-blade-thickness position is set within a range of 25% to 40% chord length, inclusive, and
the maximum-blade-thickness position is set within the range of 10% to 30% chord length, inclusive, when the dimensionless radial position is 1.0.

4. The wind turbine blade according to claim 3, wherein
the dimensionless radial position is set within a range of 0.7 to 0.85, inclusive, and the maximum-blade-thickness position is set within a range of 26% to 36% chord length, inclusive, and
the maximum-blade-thickness position is set within the range of 20% to 30% chord length, inclusive, where the dimensionless radial position is 1.0.

5. The wind turbine blade according to claim 1, wherein the shape of a cross-section at the blade tip is a symmetrical airfoil.

6. A wind turbine generator comprising:
a wind turbine blade comprising:
a blade body having a chord length that decreases from a blade root side to a blade tip side,
wherein
the blade body includes:
a blade-tip region in which a dimensionless radial position is within the range of 0.6 to 1.0, inclusive, the dimensionless radial position being the ratio of radial position to blade radius (½ of a blade diameter); and
a blade-body region in which the dimensionless radial position is smaller than 0.6,
wherein a maximum-blade-thickness position of a blade cross-section in the blade-tip region is closer to a leading edge than a maximum-blade-thickness position of a blade cross-section in the blade-body region, wherein the leading edge in the blade-tip region is shifted in the direction of the trailing edge such that a maximum-blade-thickness line formed by connecting, in the radial direction, the maximum-blade-thickness positions of the blade cross-sections at radial positions form a substantially straight line, and wherein the leading edge in the blade-tip region is S-shaped such that the leading edge shifts greatly toward the trailing edge in a transition region from the blade-body region to the blade-tip region, shifts gradually in the direction of the trailing edge toward the blade tip in a connecting region, which is connected to the transition region, and shifts in the direction of the trailing edge to finally connect with the blade tip in an end region, which is connected to the connecting region;

a rotor connected to a blade root of the wind turbine blade and rotated by the wind turbine blade; and a generator configured to convert a rotational force received by the rotor to electric power.

* * * * *